United States Patent
Albright (10) Patent No.: US 9,223,027 B1
(45) Date of Patent: Dec. 29, 2015

(54) RESCUE METHOD AND SYSTEM FOR AN OVERBOARD PASSENGER

(71) Applicant: Steven Albright, Clayton, NY (US)

(72) Inventor: Steven Albright, Clayton, NY (US)

( * ) Notice: Subject to any disclaimer, the term of this patent is extended or adjusted under 35 U.S.C. 154(b) by 0 days.

(21) Appl. No.: 14/664,046

(22) Filed: Mar. 20, 2015

Related U.S. Application Data (63) Continuation of application No. 13/957,676, filed on Aug. 2, 2013, now Pat. No. 8,998,666.

(51) Int. Cl.
  *B63C 9/26* (2006.01)
  *B63C 9/00* (2006.01)
  *G01S 19/17* (2010.01)
  *B63C 9/22* (2006.01)
  *B63B 35/00* (2006.01)

(52) U.S. Cl.
  CPC . *G01S 19/17* (2013.01); *B63C 9/00* (2013.01); *B63C 9/22* (2013.01); *B63B 2035/005* (2013.01); *B63B 2035/006* (2013.01); *B63C 2009/0017* (2013.01)

(58) Field of Classification Search
  CPC .................................... B63C 9/26; B63C 9/00
  USPC .......................................... 441/80; 340/573.6
  See application file for complete search history.

(56) References Cited

U.S. PATENT DOCUMENTS

| | | | | |
|---|---|---|---|---|
| 3,026,545 A | * | 3/1962 | Brainard, II | B63B 23/28 114/144 A |
| 4,305,143 A | * | 12/1981 | Simms | H04B 11/00 340/573.6 |
| 4,579,536 A | * | 4/1986 | Cameron | B63C 9/04 114/121 |
| 4,702,715 A | | 10/1987 | Winick | |
| 4,711,196 A | * | 12/1987 | Wilks | B63B 23/40 114/144 A |
| 4,747,797 A | * | 5/1988 | Hindle | B63C 9/04 114/138 |
| 5,006,831 A | * | 4/1991 | de Solminihac | B63C 9/0011 340/539.1 |
| 5,034,847 A | * | 7/1991 | Brain | B63C 9/20 200/61.04 |
| 5,517,199 A | * | 5/1996 | DiMattei | G01S 5/0027 342/357.31 |
| 5,597,335 A | * | 1/1997 | Woodland | B63B 7/082 114/345 |
| 5,710,989 A | * | 1/1998 | Flood | G08B 25/016 200/61.05 |
| 5,886,635 A | * | 3/1999 | Landa | G08B 21/088 340/539.1 |
| 6,222,484 B1 | * | 4/2001 | Seiple | B63C 9/0005 342/357.55 |
| 6,545,606 B2 | | 4/2003 | Piri et al. | |
| 6,558,218 B1 | * | 5/2003 | Hansen | B63C 9/01 411/35 |
| 7,053,822 B2 | * | 5/2006 | Rickerson, Jr. | B63C 9/20 342/357.54 |

(Continued)

*Primary Examiner* — Lars A Olson
*Assistant Examiner* — Jovon Hayes
(74) *Attorney, Agent, or Firm* — Michael J. Feigin, Esq.; Feigin & Associates, LLC (57) ABSTRACT

A system and method are used for dispatching a rescue flotation device to an individual who has fallen overboard from a ship. A water-activated transmitter is carried or worn by each and every passenger on a given ship. Upon detecting moisture, the transmitter is activated to send a data signal to a radio signal receiver on the ship. The contents of the data signal may be the location and/or coordinates of the victim, as determined by triangulation of the signal, a GPS receiver and/or radar. Upon transmission of the data, a rescue flotation device or vessel is automatically deployed from a portion of the vessel into the water. The rescue device may be dispatched from a portion of the ship nearest to the determined location of the victim, and/or the rescue device may be self-propelled such that it navigates to the approximate location of victim.

20 Claims, 5 Drawing Sheets

(56) References Cited

U.S. PATENT DOCUMENTS

| | | |
|---|---|---|
| 7,335,077 B2 | 2/2008 | Chiappetta |
| 8,358,223 B2 | 1/2013 | Read et al. |
| 8,810,436 B2 * | 8/2014 | Zagami ............... G08B 13/183 340/573.6 |
| 8,998,666 B1 * | 4/2015 | Albright ............... B63C 9/0005 340/539.13 |
| 2010/0295675 A1 * | 11/2010 | Lyon ................... B63C 9/0005 340/539.13 |
| 2012/0178319 A1 | 7/2012 | Spencer |
| 2012/0229282 A1 * | 9/2012 | Zagami ............... G08B 13/183 340/573.6 |
| 2013/0008367 A1 | 1/2013 | Michaud et al. |
| 2013/0043092 A1 | 2/2013 | Clardy |

\* cited by examiner

RESCUE METHOD AND SYSTEM FOR AN OVERBOARD PASSENGER

FIELD OF THE DISCLOSED TECHNOLOGY

The disclosed technology relates generally to emergency dispatch and, more specifically, emergency rescue of overboard passengers of a ship.

BACKGROUND OF THE DISCLOSED TECHNOLOGY

Ships, boats and other watercraft are widely-used by many people for transportation, fishing, vacation, and recreation. Improvement of technology and relatively low cost, especially with regard to passenger cruise ships, have led to an increase in the number of cruise ships transporting vacationers to various locales around the globe.

Safety continues to be an important issue for cruise vacation providers. Yet, every year passengers and crew members on various sea vessels fall overboard and are lost due to drowning and/or prolonged exposure to harsh elements/conditions. The individual causes of people falling overboard range from rough seas to mere accidents. If a witness isn't nearby to report an overboard passenger, there is a strong likelihood that the disappearance of the person will not be noticed in time to locate and rescue the person. Thus, by the time rescue operations are initiated, the overboard individual may have drowned or been swept away a great distance by moving currents. Cruise ships and other boats are often fitted out with life boats and life rings. However, even if the fall overboard of a passenger is witnessed, it may still be difficult to effect the proper dispatch of the rescue device to the passenger, given the movement of the seas and the wake created by the vessel. This is especially true of unmanned rescue devices, such as life vests or life rings thrown overboard for retrieval by the victim, especially if the victim is injured or otherwise rendered incapacitated due to his/her fall overboard.

More often than not, a passenger falling overboard goes unnoticed, and no alarm is raised until the passenger is deemed to have gone missing. By the time this occurs, the ship may be miles away from the overboard passenger, and the likelihood of rescue could be very low. Thus, there is a need, unfulfilled in the prior art, for automatically alerting crew members of a ship of the approximate location of an overboard passenger, and automatically dispatching a homing rescue device to such a location.

SUMMARY OF THE DISCLOSED TECHNOLOGY

Therefore, it is an object of the disclosed technology to provide a system and method for automatically dispatching a rescue flotation device to a location of an overboard passenger, based on a water-activated transmitter carried or worn by the passenger.

As such, in an embodiment of the disclosed technology, a system is used for rescuing an individual who has fallen off a ship into water. The system uses a plurality of water-activated signal transmitters. Each of the transmitters are worn by a passenger of a ship. At least one receiver is mounted on the ship. The receiver is operable to detect a signal transmitted from the signal transmitters. The system also has at least one flotation rescue device mounted on the ship. The rescue device is equipped with a motor and a navigation system. The navigation system is capable of directing the rescue device to an activated signal transmitter. The transmitter may be incorporated into a room card (access card or key to gain access into a room) of a cabin on the ship, and may require salt-water for activation. The transmitter may further be equipped with a Global Positioning System receiver capable of detecting a location of the transmitter, and transmitting the location in the signal sent to the receiver. "GPS" (Global Positioning System) is defined as a satellite navigation system that provides location and time information in all weather conditions, anywhere on earth. Thus, a "GPS receiver" is defined as any device capable of interacting with or accessing the Global Positioning System. The rescue device may be further operable to detect said signal and navigate towards a direction of the signal. Further, the rescue device may have a receiver for receiving the signal containing the location of the transmitter. The navigation system of the rescue device may use the location-containing signal in navigating to the transmitter.

The flotation device is dispatchable and takes into account the speed and direction of the ship. That is, the navigation of the rescue device determines, based on the ship's speed and direction, how far the transmitter is from the ship, and in what direction the rescue device should proceed. Using this information, the rescue device may be dispatched by a statistically most probable current location of the transmitter. The signal may be detected by satellites which control the rescue device. That is, the transmitter and/or the rescue device may employ an output from global positioning satellites in order to accurately guide the rescue device to the location of the transmitter. In one embodiment, multiple radio signal receivers may be mounted to different portions of the ship, such as, for example, the aft and the bow. In this embodiment, the location of the transmitter may be determined based on a triangulation technique employed by the receivers. "Triangulation" is defined as the process of determining the location of a point by measuring angles to it from known points, the known points being the locations of the receivers mounted on the ship.

In a further embodiment of the disclosed system, a flotation rescue device may be dispatched from another ship if the other ship is closer to the location of the transmitted signal. Thus, if a nearby ship employs the same system, and if the nearby ship detects the transmitter, then the flotation rescue device may be dispatched therefrom. Further, the signal may be detected by satellites and a position of said transmitter is dispatched to a closest ship to the transmitter, wherein the closest ship is selected from a group of ships having similar rescue devices causing a rescue device to be dispatched to the location of the signal transmitter. In a still further embodiment, if a transmitter is determined to have been activated, but the coordinates of the transmitter are unascertainable, then the rescue device may be directed to traverse a known path recently traveled by the ship as determined by the ship's GPS. The rationale for this feature is that an overboard passenger, even taking into account currents and weather, is not likely to have strayed very far from the ship's wake in the time immediately following a fall overboard. For example, if the ship is traveling due south at 270°, then the rescue device would be dispatched to navigate due north at 90° in order to back track over the path traveled by the ship. In a further embodiment, the rescue device may be configured to stop at a location along the known path based on a duration of time during which the transmitter has been activated and a velocity of the ship.

In another embodiment of the disclosed technology, a method is used for rescuing an overboard victim. The method is carried out, not necessarily in the following order, by: A) providing a transmitter to each passenger on a ship, the transmitter becoming activated when immersed in water; B) detecting a signal transmitted by an activated transmitter; C) determining the location of the activated transmitter; and D) launching a self-powered locomotive flotation device from the ship, and sending commands to the device, the commands having instructions to navigate by way of the self-powered locomotion towards the location of the activated transmitter. A "locomotive" device is defined as a device having an independent motor or similar mechanism for propelling the device without requiring external force. A "self-powered" device is defined as any device that incorporates an on-board power source, such as a battery or gas-powered engine, for operating the device.

In a further embodiment of the disclosed method, the commands are automated to cause the self-powered locomotive flotation device to automatically navigate by way of the self-powered locomotion towards the location of the activated transmitter. In another embodiment, the commands are manually sent by a user remotely controlling the navigation of the self-powered locomotive flotation device towards the location of the activated transmitter. In still another embodiment, the step of launching is an automated process after the step of detecting, and wherein the navigation is automated based on the determining of the location.

The rescue device may employ a motor and navigation system for directing the rescue device towards the location of the activated transmitter. In embodiments, the step of determining the location of the activated transmitter is carried out using triangulation of the signal. In still further embodiments, the transmitter may have a satellite positioning system, and the step of determining location may be carried out by the satellite positioning system. Still further, an additional step may be provided of navigating the rescue device along a route along which the ship has traveled, based on a navigation system of the ship.

In a still further embodiment, an additional step may be included of determining, upon receiving a signal from said activated transmitter, if a the signal is a false alarm by detecting if the signal is being sent from a point on said ship. The step of detecting if the signal is being sent from a point on the ship may be based on a signal strength of the signal. Further, the step of detecting if the signal is being sent from a point on the ship may be based on an elevation of the signal. Still further, the step of detecting if the signal is being sent from a point on the ship may be based on a comparison of a detected velocity of said signal transmitter to a velocity of said ship.

In yet another embodiment of the disclosed technology, a method is used for rescuing an overboard victim. The method is carried out, not in any particular order, by: A) providing a plurality of cards to passengers on a ship, each of the cards having a water-activated, signal-transmitting beacon; B) detecting a signal being transmitted from a beacon; C) determining that the signal is being emitted from a location outside the confines of the ship; D) determining a direction of the transmission of the signal by using a directional antenna employing a direction-finding technique; E) approximating a distance of the beacon from the ship; F) launching a self-powered locomotive flotation device of a plurality of self-powered locomotive flotation devices mounted at several points on the ship, the self-powered locomotive flotation device determined to be closest of the plurality of rescue devices to the beacon; and G) directing the self-powered locomotive flotation device towards the beacon, using a motor on the rescue device. A "beacon" is defined as a device designed to attract attention to a specific location by emitting radar, radio, sonic and/or visual signals to assist in identifying a location of and/or navigating to a location of the beacon. "Cards" are defined as any cards issued to passengers on a ship for purposes of identification, unlocking cabin doors, facilitating payments, and/or embarkation/disembarkation. Such cards may already be equipped with radio-frequency identification chips or magnetic strips for purposes of interacting with other devices. A "motor" is defined as any machine for converting energy into motion.

It should be understood that the use of "and/or" is defined inclusively, such that the term "a and/or b" should be read to include the sets: "a and b," "a or b," "a," "b."

DETAILED DESCRIPTION OF EMBODIMENTS OF THE DISCLOSED TECHNOLOGY

In an embodiment of the disclosed technology, a system and method are used for dispatching a rescue float to an overboard passenger or crew member (herein "victim" or "overboard passenger") from a ship, boat or other watercraft (herein "ship"). A water-activated transmitter is carried or worn by each and every passenger (including crew members, in embodiments of the disclosed technology) on a given ship. Upon detecting moisture, the transmitter is activated to send a data signal to a radio signal receiver on the ship. The contents of the data signal may be the location and/or coordinates of the victim as determined by triangulation of the signal and/or a GPS receiver. Upon transmission of the data, a rescue flotation device or vessel (herein "rescue device") is automatically deployed from a portion of the vessel into the water. The rescue device may be any floating device capable of acceleration in water. The rescue device may be dispatched from a portion of the ship nearest to the determined location of the victim, and/or the rescue device may be self-propelled, such that it navigates to the approximate location of victim.

Embodiments of the disclosed technology will become clearer in view of the following description of the drawings.

Figure 1:
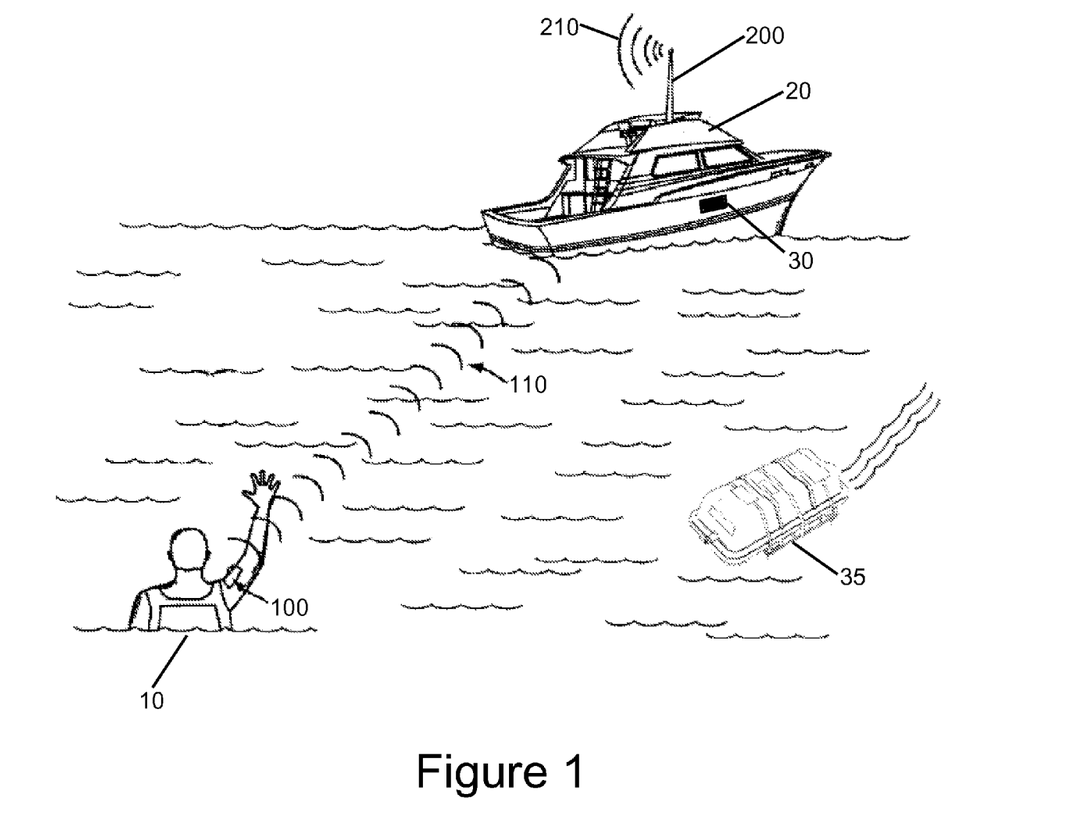
FIG. 1 shows a general overview of an overboard passenger rescue system of an embodiment of the disclosed technology.

FIG. 1 shows a general overview of an overboard passenger rescue system of an embodiment of the disclosed technology. A victim 10 who has fallen overboard from a ship 20 is shown. While the ship 20 is illustrated as a regular boat, it may be any vessel known in the art, such as, but not limited to, a cruise ship, a fishing boat, a passenger ferry, a cargo or container ship, a naval vessel, or the like. The victim 10 is shown wearing a transmitter 100. Upon sensing water, the transmitter 100 may transmit a data signal 110 to a receiver 200 on the nearby ship 20. Alternatively, the receiver 200 may send a signal 210 to the transmitter 100. Thus, data signals may be transmitted back and forth between the transmitter 100 and the receiver 200. Furthermore, the transmitter 100 may generally emit a signal that is capable of being picked up by any nearby ships or aircraft. For purposes of this specification, the terms transmitter 100 and receiver 200 will refer to devices disposed on a passenger 10 and the ship 20, respectively, regardless of whether each device sends and/or receives signals.

Upon receiving the signal 110 indicative of an overboard passenger, the receiver 200 activates a rescue system on the ship. The rescue system employs a rescue device 35 disposed on portion of, or within, a housing 30 on the ship 20. The rescue device 35 is then dispatched from the housing 30 into the water for retrieval by the victim 10.

Depending on the data signal 110 received from the transmitter 100, a particular, single rescue device 35 of a plurality of rescue devices disposed on the ship 20 is dispatched. For example, a passenger ship that is 1000 feet in length and 200 feet wide at the rear may have multiple rescue devices disposed along the sides and rear of the ship at 50 foot intervals. Thus, a rescue device 35 may be dispatched from the portion of the ship 20 nearest to where the victim 10 is located in the water, as determined by the data signal 110. On a fast-moving ship, the particular rescue device that is dispatched may depend on the amount of time that has passed between the transmitter 100 first sensing water and the time at which the rescue device 35 was dispatched. In a case where dispatch of the rescue device 35 may be instantaneous or nearly-instantaneous (limited only by transmission speed and processing of the data via automated processes) to the sensing of water by the transmitter 100, the device may be dispatched from the location nearest to the victim 10.

The rescue device 35 may be a life vest or similar flotation device. Additionally, the rescue device 35 may have a battery-powered motor for propelling and/or steering the rescue device 35. For example, a light-weight propeller and rudder may be equipped on the rescue device 35 for automated or manual navigation to the victim 10. The motor, battery, propeller, and rudder are sufficiently light in weight, such that the rescue device 35 floats, and is capable of keeping an adult human afloat, upon reaching the victim 10. The rescue device 35 has a floatable body, such that its buoyancy maintains an upright orientation of the rescue device with the propeller and rudder disposed in the water. Thus, the rescue device 35 may have a symmetrical top and bottom surface, such that the device may be operated regardless of which surface is on top when the device lands in the water. Alternatively, the rescue device 35 may have a keel or some other counter-weight for keeping the rescue device upright in the water.

In the automated embodiment, as illustrated in FIG. 1, the rescue device 35 may receive the location coordinates of the victim 10 from the transmitter 100 and/or the receiver 200, so that the rescue device 35 can be automatically navigated towards the vicinity of the victim 10, using an on-board computer to control the propeller and rudder. Alternatively, an automatic computer on the ship 20 may send radio signals to a receiver on the rescue device 35 for purposes of controlling the propeller and rudder. In a manual embodiment, a crew member aboard the ship may be alerted to the overboard victim 10, and may dispatch and control the rescue device 35 by use of a remote control.

The transmitter 100 is preferably on the person of each passenger of the ship at all times. When used on passenger cruise ships, the transmitter 100 may be incorporated into each passenger's identification and/or room card. Such cards, which serve multiple purposes, are issued by many cruise lines to be carried by every single passenger. On a naval vessel or cargo ship, the transmitter 100 may be, for example, incorporated into each crew member's badge or uniform. All crew members of warships must typically be uniformed at all times when they are outside of their cabin, and thus, if the transmitter 100 is part and parcel of each crew member's shirt, it would automatically be on the crew member at all times when there is a risk of his/her falling overboard.

The transmitter 100 is water-activated by using a water sensor. The water sensor may have two electrodes, which, when dispersed in water, decreases the resistance between the two electrodes, thereby completing and activating a electrical circuit with an on-board battery and signal transmitter. The maximum amount of resistance needed to activate the transmitter 100 is adjustable, based on the type of water. That is, the electrodes may activate the transmitter 100 only if the electrodes are dispersed in saltwater (as opposed to freshwater). Thus, this would eliminate false alarms in instances when the transmitter is accidentally exposed to water on the ship. For example, if a cruise passenger went swimming with the transmitter in a pool on the ship, or if a crew member accidentally got the transmitter wet while using a sink, the transmitter would not be activated, provided that this occurred in freshwater. This is because saltwater has a much higher conductivity than freshwater. due to the particle content contained therein. Thus, the electrical circuit of the transmitter 100 may require a liquid of an elevated conductivity to be activated. With regard to cruise ships with saltwater pools, an additional measure against false alarms may immediately make a determination whether an activated transmitter is coming from a point within the confines of the ship, as will be discussed in greater detail below.

FIG. 1 represents a simplified example of a configuration of the disclosed technology for illustrative purposes. The disclosed technology may be employed on very large ships, such as cruise ships, container ships, or naval vessels. When carrying out the embodiment on a large scale, a plurality of rescue devices 35 and corresponding rescue device housings 30 may be placed at various points on a large ship. Moreover, a plurality of receivers 200 may be mounted at various points on the ship 20, in order to improve accuracy and guarantee that the signal from the victim 10 will be received.

In one embodiment, the disclosed technology may be carried out by using direction-finding techniques. "Direction-finding" is defined as the establishment of a direction from which a received signal was transmitted by using radio signals or other wireless forms of communication. In the embodiment shown, the transmitter 100 acts as a beacon, continuously giving off a radio signal upon activation. A directional antenna 200 on the ship determines the source of the transmitted radio signal by determining from which direction the maximum signal is obtained. Upon determination of the signal direction, the rescue device 35 may be dispatched in the direction of the received signal.

As for the distance to be traveled by the rescue device 35, a pre-configured distance may be implemented based on the speed of the ship and the average time it takes for the overboard passenger's transmitted signal to be picked up. For example, if a ship is moving at 7 knots, and a passenger is determined to have fallen overboard 15 minutes earlier than the time of launching of the rescue device, the following calculation is performed. Firstly, knots are converted to miles per hour, which would yield that at 7 knots, the ship is traveling at approximately 8 miles per hour. Because the passenger fell overboard 15 minutes prior, the ship will have traveled 2 miles from the point at which the passenger fell overboard. Thus, the rescue device may be pre-configured, upon dispatch, to travel 2 miles in the direction of the received radio signal, as determined by the aforementioned direction-finding techniques. In further embodiments of the disclosed technology, if a direction of the signal is undetermined, the rescue device may additionally be configured to simply back-track over the ship's traveled path, and stop at a pre-configured distance determined by using the aforementioned distance calculation.

A receiver 200 on the ship 20 may be constantly seeking out distress signals, in a Doppler-type configuration. That is, the receiver 200 may send out signals in all directions radially from the center of the ship 20. Upon detection of a distress signal, the rescue system is initiated. Thus, under such a system, it would be possible for a second ship to pick up a signal transmitted from an overboard or shipwrecked passenger of a first ship. This is especially likely if, for some reason, the transmitter was not immediately activated upon the passenger falling overboard. By the time of activation, the overboard passenger may be closer to a different ship than the one from which the passenger originated. Such would possibly be the case if the system is used in inland waterways or busy harbors.

Figure 2:
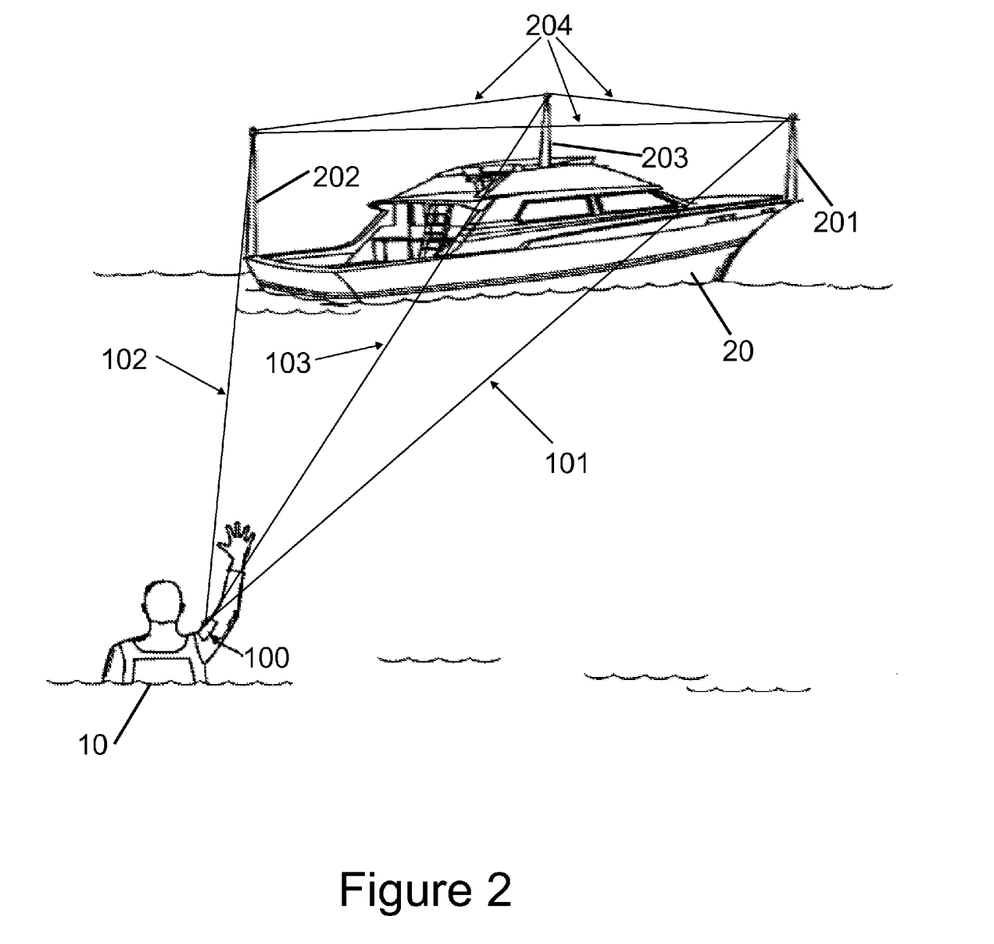
FIG. 2 shows a general overview of a triangulation configuration of a rescue system of an embodiment of the disclosed technology.

FIG. 2 shows a general overview of a triangulation configuration of a rescue system of an embodiment of the disclosed technology. In systems and methods of the disclosed technology, radio signal triangulation may be used to determine the location of the overboard victim 10 via the transmitter 100. A triangulation system requires three or more known points and a single unknown point, the distance between each of which is used to calculate a location of the unknown point. Such a system may require three or more antennae/receivers on different locations of the ship 20. In the example shown, a first receiver 201 is disposed on a point at the front of the ship 20, a second receiver 202 is disposed on a point at the rear of the ship 20, and a third receiver 203 is disposed around the middle of the ship 20.

In operation, a known signal 204 is transmitted between the first receiver 201, the second receiver 202, and the third receiver 203. Each receiver then receives the beacon signal from the transmitter 100, and communicates with the other receivers to determine the distance and location of the transmitter 100, using triangulation. Thus, the first receiver 201 receives a first signal 101 from the transmitter 100. The second receiver 202 receives a second signal 102 from the transmitter 100. And the third receiver 203 receives a third signal 103 from the transmitter 100. Using this system, the dispatched rescue device 35 is calibrated to navigate to the location of the transmitter 100 using the same triangulation principles. Thus, the rescue device 35 may also have a radio signal transmitter.

Given the possibility that the transmitter 100 is not activated until the ship 20 is a great distance away from the victim 10, an on-land or an off-shore receiver may serve as one of the points used to triangulate the position of the transmitter. That is, because the three on-board receivers 201, 202, 203 are spatially located close to one another, it may be difficult to determine a specific location and distance to a victim 10 that is far from the ship 20. Thus, an alternative triangulation point may be used elsewhere, at a location not on the ship 20. In further embodiments, Doppler triangulation may be employed to determine location and distance with greater specificity.

Alternatively, the transmitter may be a distress radio beacon, such as, for example, an Emergency Position Indicating Radio Beacon (EPIRB), an Emergency Locater Transmitter (ELT), or a Personal Locater Beacon (PLB). Such a beacon, when activated manually or by water-immersion, sends out a distress signal. The signal is picked up by satellites managed by a world-wide monitoring service, and the location of the transmitter is determined. Upon detection of the distress signal, emergency respondents may communicate with the ship to initiate rescue services or dispatch third party rescue services, such as, for example, the coast guard of a nearby landmass. As such, the communication with the ship may cause the rescue device 35 to be dispatched automatically. That is, the emergency respondents may directly communicate with the ship to launch the rescue device 35.

In another embodiment of the disclosed technology, the location of the transmitter 100 may be determined using a global positioning system (GPS). In this embodiment, the transmitter 100 may use a small GPS receiver therein. Developments in GPS technology have led to the introduction of GPS receivers that are smaller and thinner than a dime, and thus such a receiver may be employed in an identification card or badge on a passenger or crew member of a ship. Upon water activation of a transmitter 100 with a GPS receiver, the GPS receiver would locate satellites to determine coordinates thereof. The GPS coordinates would be traceable by a computer on the ship 20, which would dispatch and control the operation of the rescue device 35 in navigating to the victim 10. As such in this embodiment, the rescue device 35 may also have an on-board GPS receiver for facilitating the navigation towards the victim 10.

Figure 3:
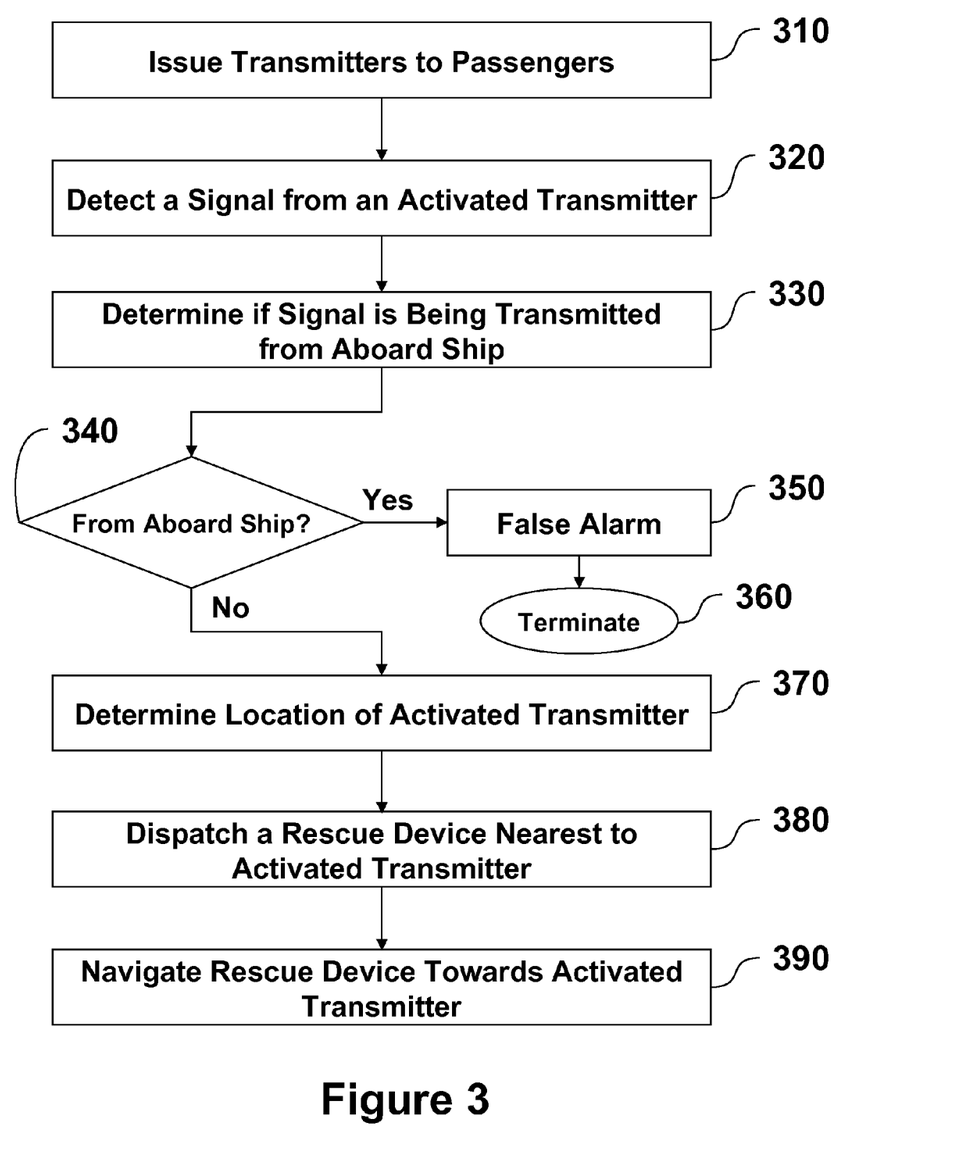
FIG. 3 shows a flow chart illustrative of steps followed to carry out a method of launching a rescue device according to embodiments of the disclosed technology.

FIG. 3 shows a flow chart illustrative of steps followed to carry out embodiments of the disclosed technology. The method is initiated in step 310 when transmitters are provided to passengers of a ship. The passengers may be any individuals that are aboard any type of ship. For example, on a cruise ship or ferry, the passengers may include guests as well as crew members. Thus, a "passenger" is defined as any individual that is aboard a ship or will be boarding the ship in the near future. "Passengers," for purposes of this specification, need not be restricted to humans and may include animals and/or transportable equipment or cargo.

In an embodiment of the disclosed technology, the transmitter is incorporated into a combination room key, identification, and payment card carried by passengers at all times. Such cards are common on vacation cruises and serve multiple purposes. They are typically required to be carried by passengers on a cruise at all times and thus would logically be on a passenger's person in the unlikely event that the passenger falls overboard. Many of such cards are already equipped with radio frequency identification (RFID) tags. The radio signal transmitter may require the addition of a battery to power the transmitter. Because the battery would only be required if the transmitter is activated, the battery may presumably be a small, one-time-use battery and would not require recharging. As briefly discussed, the card may also have an on-board GPS chip that is also powered by the battery and only activated when the card is immersed in water. In other embodiments, the transmitter may be incorporated into another article that is on a passenger's person at almost all times. For example, on a naval vessel, the transmitter may be incorporated into an officer's or other crew member's badge.

Referring still to FIG. 3, the method proceeds with step 320, whereby a distress signal is sought and detected using an on-board receiver or antenna. The distress signal is transmitted from a transmitter that has been immersed in water. Inevitably such a system would be prone to false alarms in situations where the transmitter is accidentally exposed to water, such as, for example, the water of a pool on a cruise ship. Thus, in step 330 it is determined whether the signal is being transmitted from a point within the confines of the ship. That is, the rough location of the signal transmission (defined as the relative direction within 45 degrees, 30 degrees, or 10 degrees, or within a 100 meter radius) is quickly detected and determined to be coming from aboard the ship or from the sea. The rough location or relative direction may be determined based on the elevation of the transmitter. Since most passenger-accessible portions of a cruise ship are elevated above the surface of the water, a detected decreased elevation of a transmitter may be determinative of whether the transmitter has fallen into the sea. Moreover, the transmitter may be equipped with a cancellation button or mechanism, by which a carrier of the transmitter may signify a false-alarm, thereby canceling any rescue operations which may be underway.

Thus, step 340 asks if the signal transmission is coming from aboard the ship. If yes, step 350 indicates a false alarm, and the method is terminated in step 360. If not, in step 370, the specific location of the transmitter on the water is determined. The location at the surface of the water is determined, and the transmitter, in embodiments, floats, to aid in transmission thereof of the location. The numerous discussed techniques may be employed for determining and tracking the location of the transmitter. It should be understood, however, that the overboard person will need to be able to grab onto or attach him or herself to the dispatched flotation device.

Upon determining the location of the transmitter, even if the location is not yet precise (GPS satellite navigation may take some time render a precise location, and/or the transmission signal from the overboard person may be weak or have interference), the rescue device may be launched from a portion of the ship nearest to the transmitter (step 390). That is, numerous rescue devices may be mounted around the perimeter of the ship. If the ship is stationary or is moving very slowly, the rescue device nearest to the location of the transmitter is dispatched. If the ship is moving, depending on its speed, the rescue device may be launched from a portion on the rear or stern of the ship. If the victim, for example, has fallen off the starboard side of the ship, then the rescue device may be dispatched from the starboard side of the stern of the ship.

In step 390, the rescue device is navigated towards, or in the direction of, the transmitted signal. This step may be carried out by an auto-piloted navigation system equipped on the rescue device. The navigation system may receive the coordinates of the transmitter from the receiver on the ship, and use GPS to navigate towards the transmitter. The rescue device may also be configured to track the transmitted signal, using an on-board receiver, and may navigate to the transmitter in this manner. In order to move in water, the rescue device may have a light-weight motor and propeller. The rescue device may also be controlled via radio signals given by a remote control on the ship. The remote control may be operated automatically by a computer, or manually by a crew member. The rescue device may further be equipped with a camera, radar, sonar, and/or GPS to further facilitate rescue. The size of the rescue device may vary. The rescue device may have an inflatable portion, which is self-inflated, using $CO_2$ or compressed air at the time of dispatch. The rescue device may be equipped with handles, ropes, or life-vests capable of keeping an adult human afloat and comfortable for an extended period of time.

Figure 4:
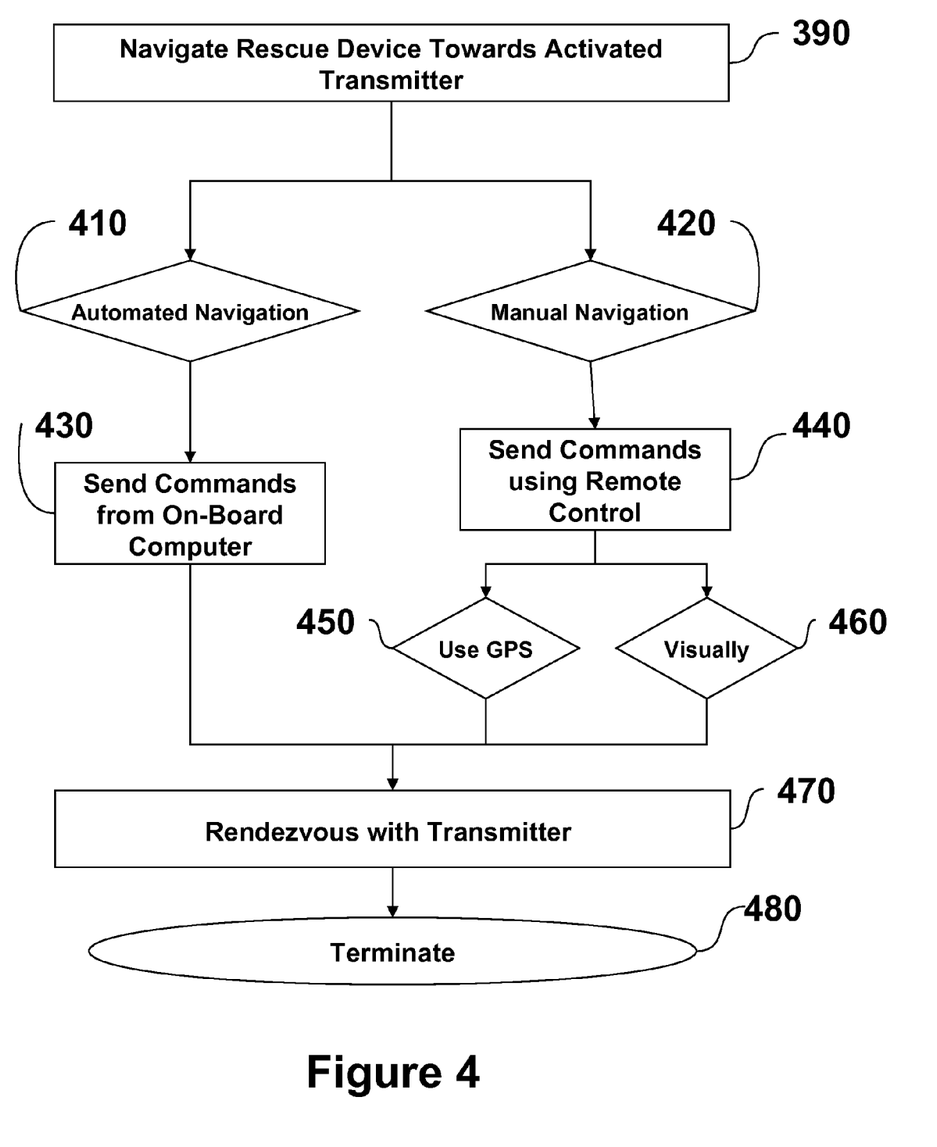
FIG. 4 shows a flow chart illustrative of steps followed to carry out navigation of the rescue device according to embodiments of the disclosed technology.

FIG. 4 shows a flow chart illustrative of steps followed to carry out navigation of the rescue device according to embodiments of the disclosed technology. The flow chart of FIG. 4 picks up where the flow chart of FIG. 3 left off. Thus, step 390 involves the initiation of navigating the device towards the activated transmitter. The device may be navigated automatically or manually, according to steps 410 and 420, respectively. Using automated navigation, step 430 dictates that commands are sent from an on-board computer to the rescue device. The commands may be received by the rescue device prior to being dispatched from the ship. Alternatively, a computer on the ship may remain in communication with the rescue device after it has been launched or dispatched. Thus, radio signals may be sent back and forth between the rescue device, and the on-board computer as the rescue device is navigated towards the transmitter.

When manual navigation is employed, in step 440, commands are sent to the rescue device using a remote control. The remote control uses radio signals to control the operation of the rescue device. As such, acceleration and steering of the rescue device is controlled by the remote control. In one embodiment, step 450 dictates that a user navigates the rescue device using GPS. In this embodiment, the user may control the rescue device via an interface with a compass or a screen with a map displaying the locations of the transmitter and the rescue device with respect to one another. Thus, the user may navigate the rescue device towards the location of the transmitter as determined by GPS.

Alternatively, in step 460, the user may remotely control the rescue visually. That is, the user may be standing on a point of the ship from which the rescue device and the transmitter may be viewable. As previously discussed, the transmitter may be a beacon with a flashing light. The flashing light may be an encoded optical signal. An encoded optical signal communicates a coded message to anyone viewing the flashing light. The light may flash at different intervals or using different colors, the summation of which projects a message which is understood by a viewer. The message may, for example, indicate to any rescuers how long the transmitter has been activated. Such information may be important for giving rescuers an idea of how long a victim has been exposed to, for example, cold water, thus giving rescuers a time frame in which they should reach the victim before hypothermia develops. Thus, the user may manually direct the rescue device towards the transmitter by following the flashing beacon. The operation of the device may be similar to that of a radio-controlled boat, in that a small handset may be used to send signals to the rescue device. Alternatively, the control of the device may be similar to that of an unmanned aerial vehicle (UAV), in that the rescue device may be equipped with a camera, the view of which is projected on a screen and viewable by the remote user in piloting the device. Such would be the case in conditions of poor visibility, or if the transmitter is at such a distance from the ship that the flashing light and/or the passenger is out of sight.

Still referring to FIG. 4, the method proceeds with step 470, whereby the rescue device is in close proximity to the transmitter. "Close proximity," for purposes of this specification, is defined as being close enough to the transmitter so that an able-bodied adult would easily be able to swim to the rescue device. Thus, "close proximity" may be between 5 feet and 50 feet, depending on the weather conditions and accuracy of the GPS and/or radio signals. Ideally, the rescue device is navigated to within arms' reach of the passenger, but of course weather conditions and limitations of the technology employed may prevent such accuracy. Thus, in embodiments, the rescue device is transmitted within swimming distance of the passenger, such as within 100 meters, 50 meters, or 10 meters. Upon the rescue device reaching the transmitter, the method may be terminated in step 480. That is, the navigation of the rescue device to the victim is completed, not necessarily the rescue of the victim. It is envisioned that further steps may be taken to rescue the victim once the rescue device has reached the victim. As such, the rescue device may employ a communication system by which the victim may communicate with members of the crew of the ship or other rescuers. Moreover, the determined coordinates of the transmitter and/or the rescue device may be employed by third parties in recovering the victim. Furthermore, once a victim is grasping the rescue device, the rescue device may conceivably continue to be navigated back to the ship or to some other point of safety.

Figure 5:
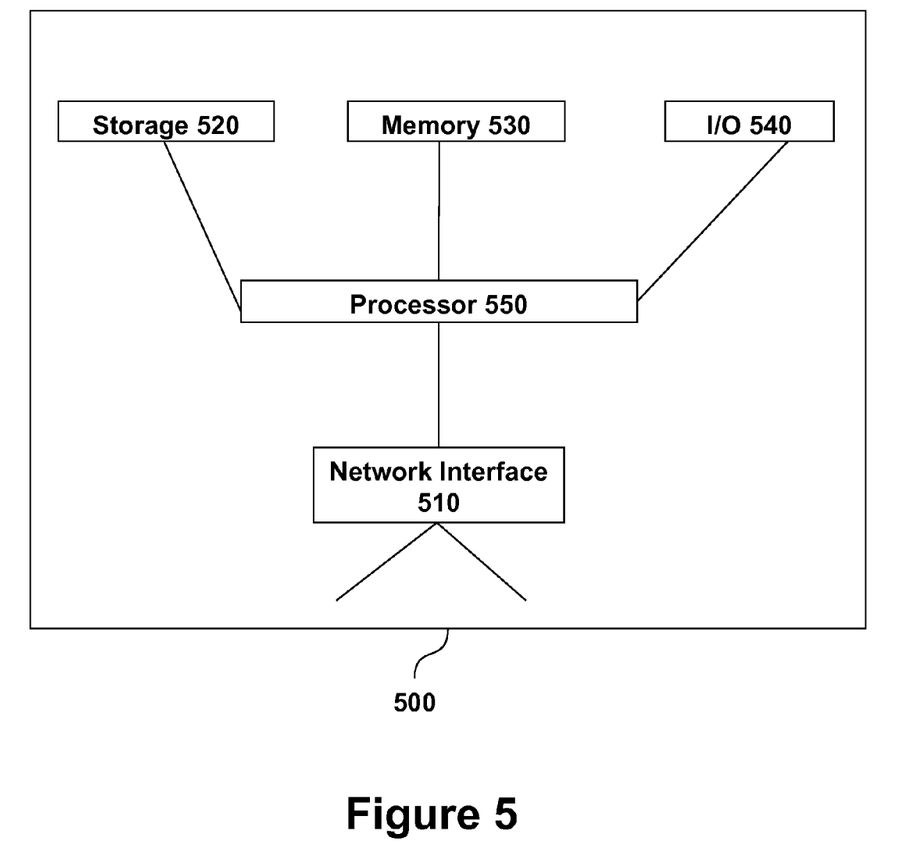
FIG. 5 shows a high-level block diagram of a device that may be used to carry out aspects of the disclosed technology.

FIG. 5 shows a high-level block diagram of a device that may be used to carry out aspects of the disclosed technology. Device 500 comprises a processor 550 that controls the overall operation of the computer by executing the device's program instructions which define such operation. The device's program instructions may be stored in a storage device 520 (e.g., magnetic disk, database) and loaded into memory 530 when execution of the console's program instructions is desired. Thus, the device's operation will be defined by the device's program instructions stored in memory 530 and/or storage 520, and the console will be controlled by processor 550 executing the console's program instructions. A device 500 also includes one, or a plurality of, input network interfaces for communicating with other devices via a network (e.g., radio signaling). The device 500 further includes an electrical input interface for receiving power and data from a battery or other power source.

A device 500 also includes one or more output network interfaces 510 for communicating with other devices. Device 500 also includes input/output 540 representing devices which allow for user interaction with a computer (e.g., display, keyboard, mouse, speakers, buttons, etc.). One skilled in the art will recognize that an implementation of an actual device will contain other components as well, and that FIG. 5 is a high level representation of some of the components of such a device for illustrative purposes. It should also be understood by one skilled in the art that the methods and devices depicted in FIGS. 1 through 4 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

I claim:

1. A water rescue system comprising:
   a plurality of water-activated signal transmitters, each transmitter being on an individual on a ship;
   at least one receiver on said ship, said receiver operable to detect a signal transmitted from said transmitters; and
   at least one flotation rescue device mounted on said ship, said at least one flotation rescue device having a motor and an independent navigation system, said navigation system directing said flotation rescue device to an activated said transmitter,
   wherein, upon receipt by said receiver of a signal transmitted by one of said plurality of water activated-signal transmitters, said at least one flotation rescue device mounted on said ship is automatically deployed.

2. The water rescue system of claim 1, wherein:
   said transmitter further comprises a Global Positioning System (GPS) receiver; and
   said signal comprises a location of said transmitter based on an output of said GPS receiver.

3. The water rescue system of claim 1, wherein said at least one flotation rescue device further comprises:
   a receiver for receiving said signal comprising said location of said transmitter, wherein said navigation system uses said location in navigating to said transmitter.

4. The water rescue system of claim 3, wherein said at least one flotation rescue device is dispatched to a statistically most probable current location of said water-activated transmitter based on a speed and a direction of said ship, and a time between said detection of said signal and said dispatch of said at least one flotation rescue device.

5. The water rescue system of claim 3, wherein said at least one flotation rescue device is dispatched and navigates to a location based a signal strength and a direction of said signal.

6. The water rescue system of claim 1, wherein said signal is detected by satellites and a position of said transmitter is dispatched to a closest ship to said transmitter, wherein said closest ship is selected from a group of ships, each having at least one said flotation rescue device, causing a said flotation rescue device to be dispatched to said location of said transmitter.

7. The water rescue system of claim 1, further comprising at least one receiver mounted at an aft said ship and at least one receive mounted at a bow of said ship, said receivers being in communication such that a location of said transmitter is triangulated based on said signal.

8. The water rescue system of claim 1, wherein an additional flotation rescue device from another ship is directed to said transmitter if said other ship is closer to said transmitter.

9. The water rescue system of claim 1, wherein said flotation rescue device is directed to traverse a known path most recently traveled by said ship as determined by a navigation system of said ship.

10. The water rescue system of claim 1, wherein said at least one flotation rescue device is configured to stop at a location along said known path based on a duration of time during which said transmitter has been activated and a velocity of said ship.

11. A method of rescuing an overboard victim, the method comprising the steps of:
    providing a transmitter to a plurality of passengers on a ship, said transmitter operable to be activated when immersed in water;
    detecting a signal transmitted by an activated said transmitter;
    determining a location of said activated transmitter; and
    following said detection of said signal, automatically launching a self-powered locomotive flotation device from said ship, and sending commands to said device, said commands comprising instructions to navigate by way of said self-powered locomotion towards said determined location of said activated transmitter.

12. The method of claim 11, wherein said navigation is automated based on said determining of said location.

13. The method of claim 11, wherein said commands are manually sent by a user remotely controlling said navigation of said self-powered locomotive flotation device towards said location of said activated transmitter.

14. The method of claim 11, wherein said self-powered locomotive flotation device comprises a motor and a navigation system for directing said self-powered locomotive flotation devices towards said location of said activated transmitter.

15. The method of claim 11, wherein:
said transmitter comprises satellite positioning system; and
said step of determining a location of said activated transmitter is carried out using said satellite positioning system.

16. The method of claim 11, further comprising a step of:
determining, upon receiving a signal from said activated transmitter, if a said signal is a false alarm, by detecting if said signal is being sent from a point on said ship.

17. The method of claim 16, wherein said detecting if said signal is being sent from a point on said ship is based on a signal strength of said signal.

18. The method of claim 16, wherein said detecting if said signal is being sent from a point on said ship is based on an elevation of said signal.

19. The method of claim 16, wherein said detecting if said signal is being sent from a point on said ship is based on a comparison of a detected velocity of said signal transmitter to a velocity of said ship.

20. A method of rescuing an overboard victim comprising:
providing a plurality of cards to passengers on a ship, each of said cards having a water-activated, signal-transmitting beacon and wherein each of said cards is a key to at least one room on said ship;
detecting a signal being transmitted from a said beacon;
determining that said signal is being emitted from a location outside of confines of said ship;
determining a direction of said transmission of said signal using a directional antenna employing a direction finding technique;
approximating a distance of said beacon from said ship;
launching a self-powered locomotive flotation device of a plurality of self-powered locomotive flotation devices mounted at varying points on said ship, said self-powered locomotive flotation device determined to be closest of said plurality of said locomotive flotation devices to said beacon; and
directing said self-powered locomotive flotation device towards said beacon using a motor on said rescue device.

* * * * *